US008468295B2

(12) United States Patent
Berke et al.

(10) Patent No.: US 8,468,295 B2
(45) Date of Patent: Jun. 18, 2013

(54) SYSTEM AND METHOD FOR REDUCING POWER CONSUMPTION OF MEMORY

(75) Inventors: Stuart Allen Berke, Austin, TX (US); William Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 569 days.

(21) Appl. No.: 12/629,681

(22) Filed: Dec. 2, 2009

(65) Prior Publication Data
US 2011/0131432 A1 Jun. 2, 2011

(51) Int. Cl.
G06F 12/00 (2006.01)
G06F 13/00 (2006.01)
G06F 13/28 (2006.01)
G11C 7/00 (2006.01)
H03M 13/00 (2006.01)

(52) U.S. Cl.
USPC .......... 711/106; 365/222; 711/104; 711/157; 711/161; 711/162; 714/754

(58) Field of Classification Search
None
See application file for complete search history.

(56) References Cited

U.S. PATENT DOCUMENTS

| | | | |
|---|---|---|---|
| 5,901,105 A | 5/1999 | Ong et al. | 365/230.06 |
| 6,590,822 B2 | 7/2003 | Hwang et al. | 365/222 |
| 6,819,617 B2 | 11/2004 | Hwang et al. | 365/222 |
| 6,950,364 B2 | 9/2005 | Kim | 362/222 |
| 6,992,943 B2 | 1/2006 | Hwang et al. | 365/222 |
| 7,088,635 B2 | 8/2006 | Hur et al. | 365/222 |
| 7,149,140 B2 | 12/2006 | Hur et al. | 365/222 |
| 7,349,278 B2 | 3/2008 | Min et al. | 365/222 |
| 7,426,151 B2 | 9/2008 | Kim et al. | 365/222 |
| 7,492,656 B2 | 2/2009 | Kim et al. | 365/222 |
| 2003/0023825 A1 | 1/2003 | Woo et al. | 711/170 |
| 2003/0028711 A1 | 2/2003 | Woo et al. | 711/106 |
| 2003/0151967 A1* | 8/2003 | Nagai et al. | 365/226 |
| 2003/0174559 A1 | 9/2003 | Cooper et al. | 365/200 |
| 2007/0106860 A1* | 5/2007 | Foster et al. | 711/170 |
| 2007/0253268 A1 | 11/2007 | Kim et al. | 365/222 |
| 2008/0056047 A1* | 3/2008 | Jain et al. | 365/222 |
| 2009/0172270 A1* | 7/2009 | Kardach et al. | 711/105 |

OTHER PUBLICATIONS

U.S. Appl. No. 12/791,563; Sauber et al.; "System and Method for Reducing Power Consumption of Memory"; pp. 34, Jun. 1, 2010.

* cited by examiner

Primary Examiner — Yaima Campos
Assistant Examiner — Marwan Ayash
(74) Attorney, Agent, or Firm — Baker Botts L.L.P.

(57) ABSTRACT

Systems and methods for reducing problems and disadvantages associated with power consumption in memory devices are disclosed. A method for reducing power consumption in memory may include tracking, by an operating system executing on a processor, one or more logical units of a memory system that are in use. The method may also include setting, by the operating system, a variable indicating a portion of the memory system in use based on the logical units of the memory system in use. The method may additionally include refreshing one or more of the one or more logical units of the memory system based on the variable.

13 Claims, 5 Drawing Sheets

COMMAND TRUTH TABLE

| FUNCTION | ABBREVIATION | CKE | | CS# | RAS# | CAS# | WE# | BA0-BA3 | A13-A15 | A12-BC# | A10-AP | A0-A9, A11 | NOTES |
|---|---|---|---|---|---|---|---|---|---|---|---|---|---|
| | | PREVIOUS CYCLE | CURRENT CYCLE | | | | | | | | | | |
| REFRESH | REF | H | H | L | L | L | H | V | V | V | V | V | |

FIG. 5B

COMMAND TRUTH TABLE

| FUNCTION | ABBREVIATION | CKE | | CS# | RAS# | CAS# | WE# | BA0-BA3 | A13-A15 | A12-BC# | A10-AP | A0-A9, A11 | NOTES |
|---|---|---|---|---|---|---|---|---|---|---|---|---|---|
| | | PREVIOUS CYCLE | CURRENT CYCLE | | | | | | | | | | |
| REFRESH | REF | H | H | L | L | L | H | BA | V | V | V | V | |

FIG. 6

BANKS TO SELF REFRESH INDICATORS

| RESERVED FOR FUTURE USE | B7 | B6 | B5 | B4 | B3 | B2 | B1 | B0 |
|---|---|---|---|---|---|---|---|---|

SYSTEM AND METHOD FOR REDUCING POWER CONSUMPTION OF MEMORY

TECHNICAL FIELD

The present disclosure relates in general to reducing power consumption in information handling systems, and more particularly to reducing power consumption of memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use memory to store data and/or instructions. Broadly speaking, term memory refers to computer components, devices, and recording media that retain digital data used for processing for some interval of time. A commonly-used type of memory is known as dynamic random access memory (DRAM). DRAM is a type of random access memory that stores each bit (or cell) of data in a separate capacitive element within an integrated circuit. Because capacitors leak charge, the information eventually fades unless the capacitor charge is refreshed periodically. Such refreshing of DRAM cells consumes power. As the density and operating frequency of DRAMs increase, so too does the power consumed by DRAMs. Such consumption of power may lead to higher operating temperatures for the DRAMs and the information handling systems in which such DRAMs are present, which may affect operability of an information handling system and its components. In addition, such consumption of power may lead to higher operating costs due to increased energy costs associated with operation, as well as costs associated with cooling systems to mitigate increased temperatures.

SUMMARY

In accordance with the teachings of the present disclosure, the disadvantages and problems associated with power consumption in memory devices have been substantially reduced or eliminated.

In accordance with an embodiment of the present disclosure, a method for reducing power consumption in memory may include tracking, by an operating system executing on a processor, one or more logical units of a memory system that are in use. The method may also include setting, by the operating system, a variable indicating a portion of the memory system in use based on the logical units of the memory system in use. The method may also include refreshing one or more of the one or more logical units of the memory system based on the variable.

In accordance with another embodiment of the present disclosure, an information handling system may include a processor, a memory system communicatively coupled to the processor and having one or more logical units, and a computer-readable medium communicatively coupled to the processor and having stored thereon one or more executable instructions. The one or more executable instructions may be configured to, when executed by the processor: (i) track one or more logical units of a memory system that are in use; (ii) set a variable indicating a portion of the memory system in use based on the logical units of the memory system in use; and (iii) refresh one or more of the one or more logical units of the memory system based on the variable.

In accordance with a further embodiment of the present disclosure, a method for reducing power consumption in memory, may include issuing a command to refresh a particular logical unit of a memory to the exclusion of other logical units of the memory.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
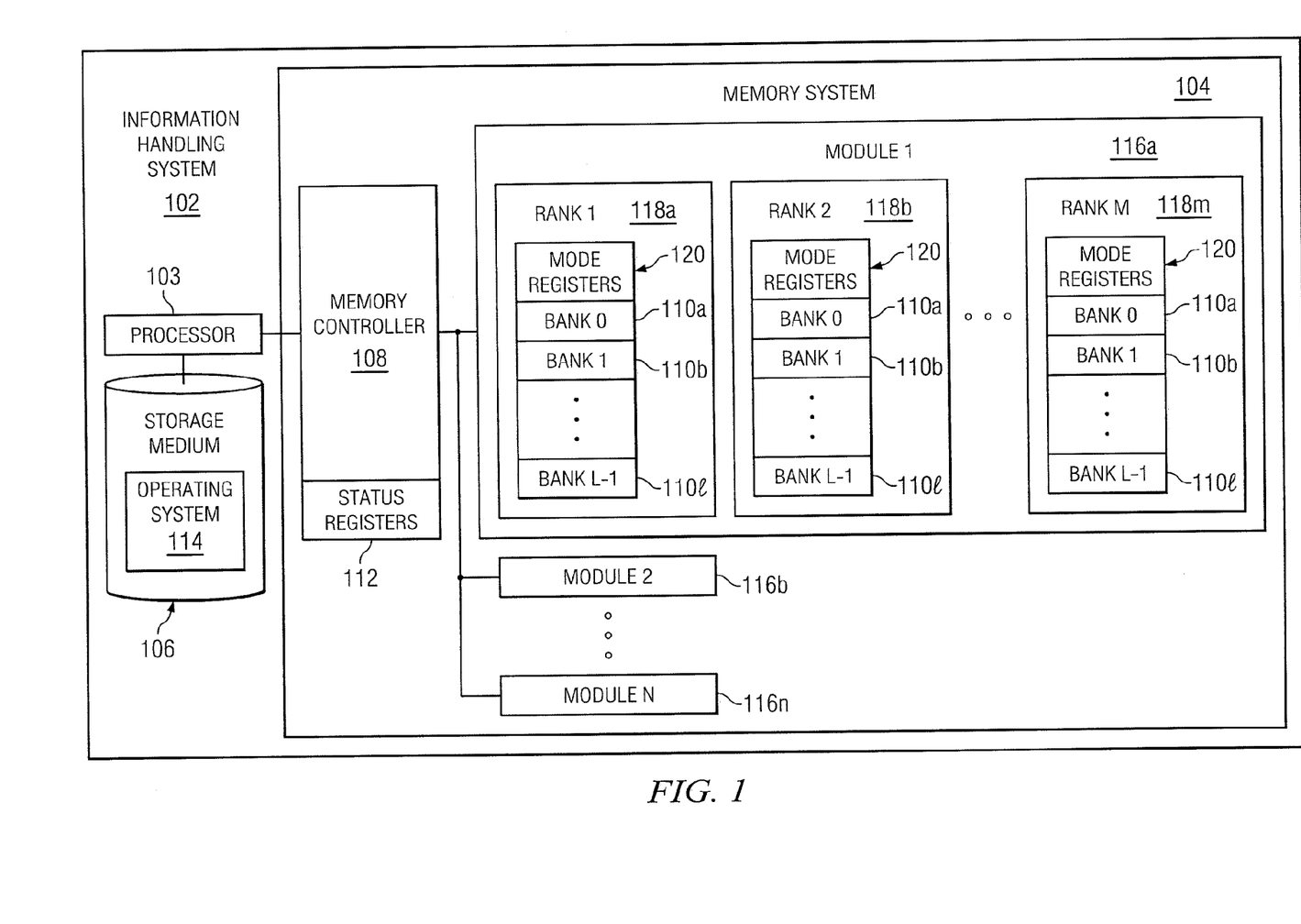
FIG. 1 illustrates a block diagram of an example information handling system incorporating partial memory refresh, in accordance with certain embodiments of the present disclosure.

FIG. 1 illustrates a block diagram of a an example information handling system 102 incorporating partial memory refresh, in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory system 104 communicatively coupled to processor 103, and a storage medium 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, storage medium 106, and/or another component of information handling system 100.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise dynamic random access memory (DRAM).

As shown in FIG. 1, memory system 104 may include memory controller 108, one or more memory modules 116a-116n communicatively coupled to memory controller 108, and status registers 112 communicatively coupled to memory controller 108. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules in embodiments in which memory system 104 comprises DRAM. Although memory controller 108 is shown in FIG. 1 as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). Each memory module 116 may include a dynamic random access memory (DRAM) module (e.g., a dual in-line package (DIP) memory, a Single In-line Pin Package (SIPP) memory, a Single Inline Memory Module (SIMM), a Ball Grid Array (BGA)), or any other suitable memory.

As depicted in FIG. 1, each memory module 116 may include one or more ranks 118a-118m. Each memory rank 118 within a memory module 116 may be a block or area of data created using some or all of the memory capacity of the memory module 116. In some embodiments, each rank 118 may be a rank as such term in defined by the Joint Electron Device Engineering Council (JEDEC) Standard for memory devices.

Also as shown in FIG. 1, each rank 118 may include mode registers 120 and one or more memory banks 110. Each memory bank 110 may be a logical unit of storage within memory system 104, which may be based on physical parameters of the memory module 116 comprising such memory bank 110.

Mode registers 120 may include one or more configuration variables and/or parameters associated with memory system 104. When reading, writing, refreshing, and/or performing other operations associated with memory system 104, a memory module 116 may carry out such operations based at least in part on configuration parameters and/or variables stored in mode registers 120. In some embodiments, mode registers 120 may be defined by a Joint Electron Device Engineering Council (JEDEC) standard for memory devices.

Status registers 112 may include one or more configuration variables and/or parameters associated with memory system 104. When reading, writing, refreshing, and/or performing other operations associated with memory system 104, memory controller 108 may carry out such operations based at least in part on configuration parameters and/or variables stored in status registers 112. In some embodiments, status registers 112 may include registers similar to mode registers 120.

Storage medium 106 may be communicatively coupled to processor 104. Storage medium 106 may include any system, device, or apparatus operable to store information processed by processor 103. Storage medium 106 may include, for example, network attached storage, one or more direct access storage devices (e.g. hard disk drives), and/or one or more sequential access storage devices (e.g. tape drives). As shown in FIG. 1, storage medium 106 may have stored thereon an operating system (OS) 114. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

In operation, processor 103 and/or memory controller 108 may manage and control the various banks 110 such that memory refresh operations may be executed with respect to one or more of banks 110, as described in greater detail below. In some embodiments, some, but not all of the banks 110 will be refreshed, thus decreasing the power consumed in connection with refresh operations as compared to traditional approaches. Examples of such embodiments are described below.

Example Embodiment 1

In accordance with an example embodiment of the present disclosure, partial memory refresh may be implemented with minimal or no change to traditional memory controllers and/or JEDEC Specifications, and may be implemented mainly within OS 114. In this embodiment, OS 114 may be configured to, when executed by processor 103, disable bank-level interleaving, and/or any reliability, availability, and serviceability (RAS) features of memory controller 108 (e.g., patrol scrubbing, sparing, mirroring, etc.), which might force multiple partially occupied banks to stay active or generate false error conditions. OS 114 may further be enabled to, when allocating and/or de-allocating memory, track such memory allocation on a per rank and/or per bank basis (e.g., by storing variables and/or parameters indicative of such usage in status registers 112 or other suitable medium). As memory is allocated and/or de-allocated, OS 114 may update variables and/or parameters stored in status registers 112 indicative of the usage of the various banks 110. In addition, OS 114 may alter the contents of a mode register to indicate a fraction of the memory being used. As a particular example, mode register MR2, as defined by the JEDEC Specification, may be modified by OS 114 to indicate usage of banks 110.

As OS 114 invokes and terminates programs executing on processor 103, it may attempt to allocate and de-allocate memory so as to fill active banks 110 before allocating additional banks 110, thus keeping the number of active banks 110 at a minimum.

Figure 2A:
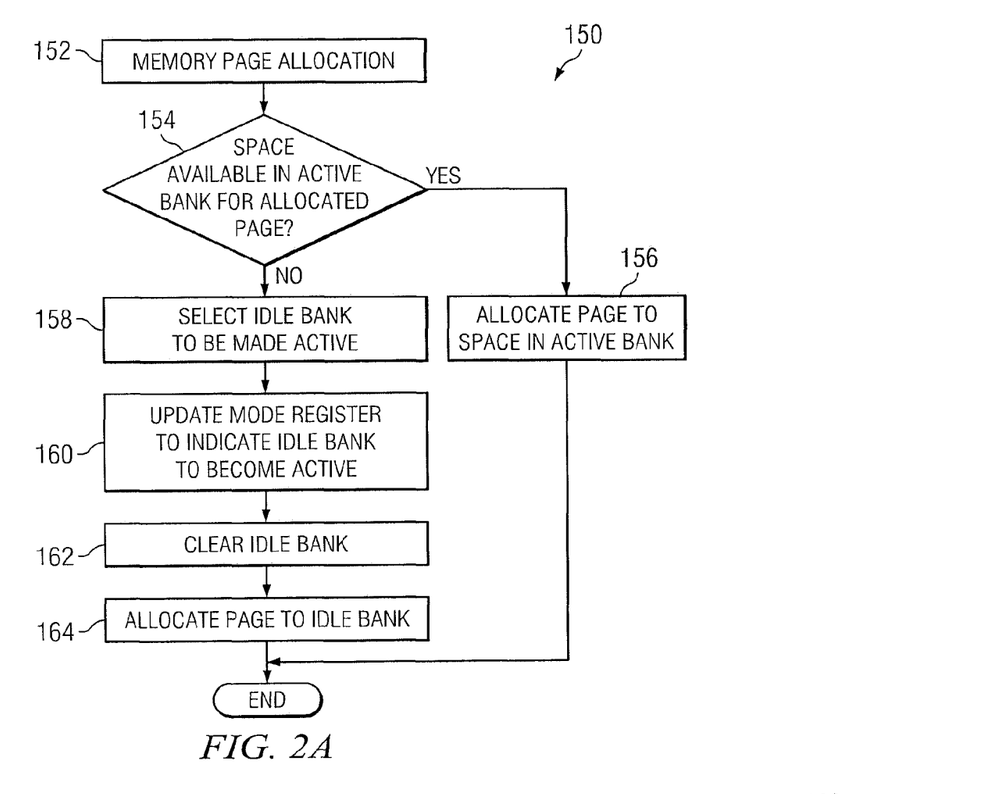
FIGS. 2A and 2B illustrate a flow chart of example methods for allocating and deallocating banks, in accordance with certain embodiments of the present disclosure.

FIG. 2A illustrates a flow chart of an example method 150 for allocating banks 110, in accordance with certain embodiments of the present disclosure. According to one embodiment, method 150 may begin at step 152. As noted above, teachings of the present disclosure may be implemented in a variety of configurations of information handling system 102. As such, the initialization point for method 150 and the order of the steps 152-164 comprising method 150 may depend on the implementation chosen.

At step 152, operating system 114, which may have been loaded into memory 104, may begin the process of allocating a page of memory to a program. At step 154, processor 103, memory controller 108, or another component of information handling system 102 may determine if space is available in a presently active bank 110 in a memory module 116 for storage of the allocated page. In some embodiments, such determination may be made by reference to parameters stored in status registers 112, mode registers 120, and/or another component of information handling system 102. If space in available in an active bank 110, method 150 may proceed to step 156. Otherwise, method 150 may proceed to step 158.

At step 156, in response to a determination that space is available in a presently active bank 110, processor 103, memory controller 108, and/or another component of information handling system 102 may allocate the page to space in an active bank 110. After completion of step 154, method 150 may end.

At step 158, in response to a determination that space is not available in a presently active bank 110, processor 103, memory controller 108, and/or another component of information handling system 102 may select a presently idle bank 110 to be made active. At step 160, a mode register 120 may be updated to indicate that the idle bank 110 is to become an active bank 110. At step 162, memory controller 108 may clear the idle bank 110. At step 164, memory controller 108 may allocate the page to the formerly idle/now active bank 110.

Although FIG. 2A discloses a particular number of steps to be taken with respect to method 150, method 150 may be executed with greater or lesser steps than those depicted in FIG. 2A. In addition, although FIG. 2A discloses a certain order of steps to be taken with respect to method 150, the steps comprising method 150 may be completed in any suitable order.

Method 150 may be implemented using information handling system 102 or any other system operable to implement method 150. In certain embodiments, method 150 may be implemented partially or fully in software and/or firmware embodied in computer-readable media.

Figure 2B:
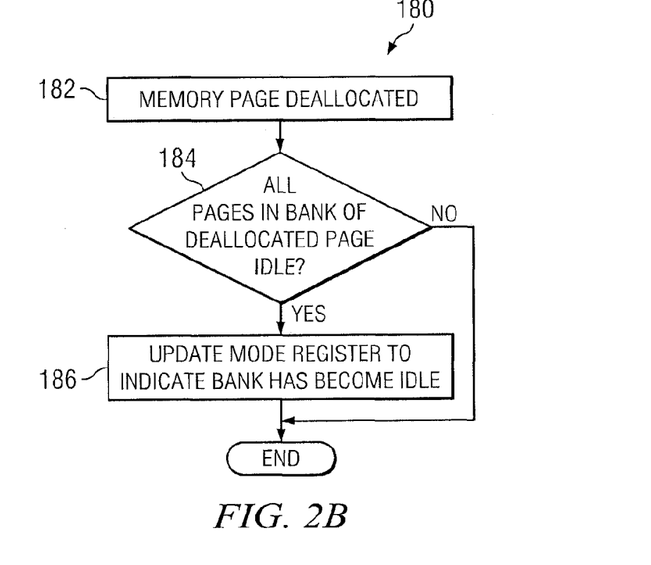

FIG. 2B illustrates a flow chart of an example method 180 for deallocating banks 110, in accordance with certain embodiments of the present disclosure. According to one embodiment, method 180 may begin at step 182. As noted above, teachings of the present disclosure may be implemented in a variety of configurations of information handling system 102. As such, the initialization point for method 180 and the order of the steps 182-186 comprising method 180 may depend on the implementation chosen.

Beginning at step 182, operating system 114 may deallocate a page from a bank 110. At step 184, processor 103, memory controller 108, or another component of information handling system 102 may determine if all pages within the bank 110 comprising the deallocated page are idle. In some embodiments, such determination may be made by reference to parameters stored in status registers 112, mode registers 120, and/or another component of information handling system 102. If all pages are idle, method 180 may proceed to step 186. Otherwise, method 180 may end.

At step 186, in response to a determination that all pages within the bank 110 comprising the deallocated page are idle, a mode register 120 may be updated to indicate that the bank 110 has become idle. After completion of step 186, method 180 may end.

Although FIG. 2B discloses a particular number of steps to be taken with respect to method 180, method 180 may be executed with greater or lesser steps than those depicted in FIG. 2B. In addition, although FIG. 2B discloses a certain order of steps to be taken with respect to method 180, the steps comprising method 180 may be completed in any suitable order.

Method 180 may be implemented using information handling system 102 or any other system operable to implement method 180. In certain embodiments, method 180 may be implemented partially or fully in software and/or firmware embodied in computer-readable media.

Figure 3:
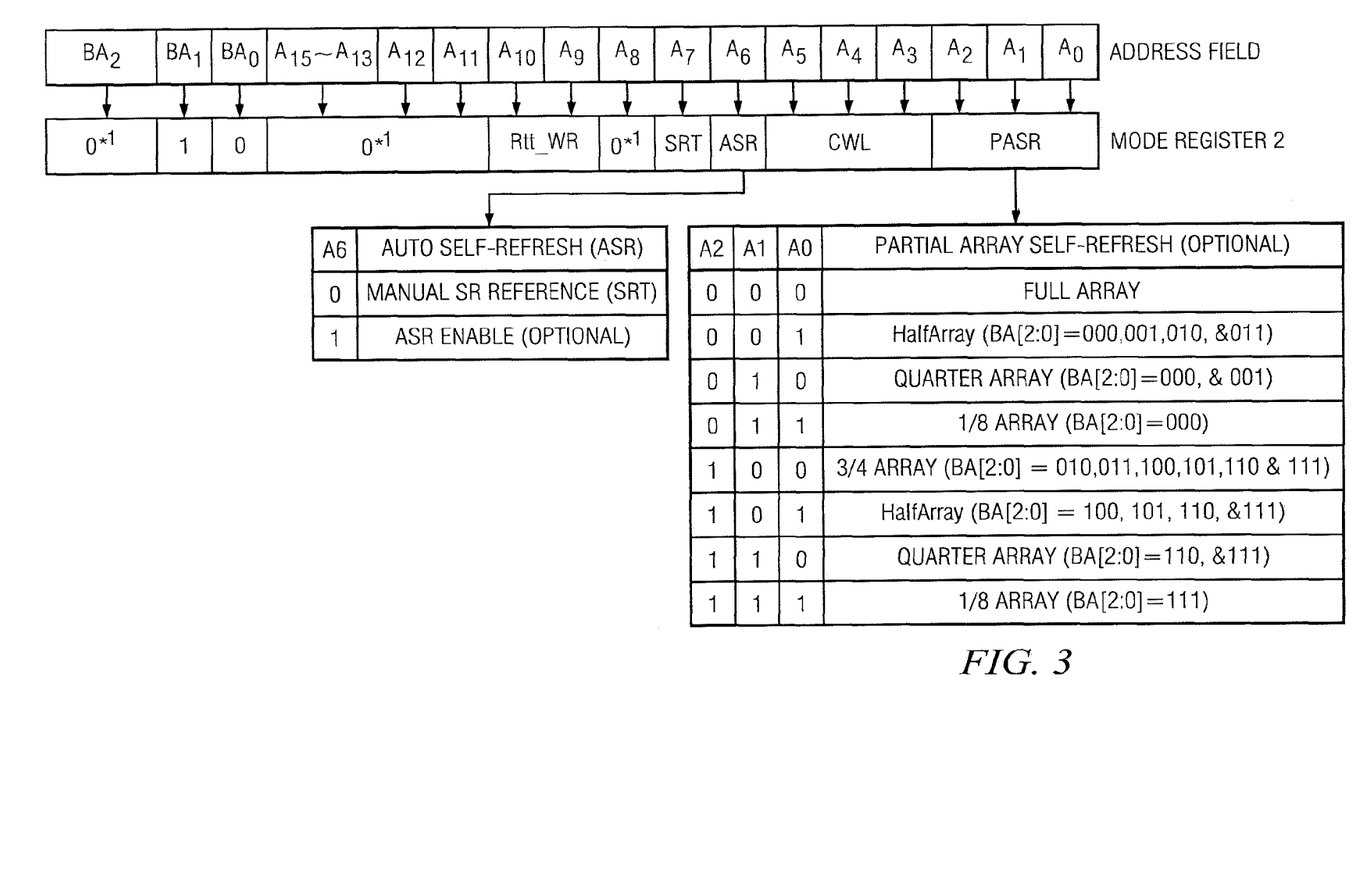
FIG. 3 illustrates various fields associated with mode register MR2 of a DRAM according to the JEDEC Specification, in accordance with certain embodiments of the present disclosure.

FIG. 3 illustrates various fields associated with mode register MR2 of a DRAM according to the JEDEC Specification, in accordance with certain embodiments of the present disclosure. As shown in FIG. 3, mode register MR2 includes a three-bit field labeled as PASR or "Partial Array Self-Refresh." By appropriately setting this field as memory pages and banks 110 are allocated and deallocated in accordance with the methods described above with respect to FIGS. 2A and 2B, such PASR field may indicate to memory controller 108 a fraction (e.g., one-eighth, one-fourth, one-half, three-fourths, all) of the banks 110 that are in use. Accordingly, during self-refresh, only a portion of the memory banks 110, as indicated by the PASR field, may be refreshed, which may reduce power consumption associated with refresh as compared to traditional approaches.

Example Embodiment 2

In accordance with another example embodiment of the present disclosure, partial memory refresh may be implemented with minimal change to traditional memory controllers and/or little or minimal change to JEDEC Specifications. In this embodiment, OS 114 may be configured to, when executed by processor 103, disable bank-level interleaving. OS 114 may further be enabled to, when allocating and/or de-allocating memory, track such memory allocation on a per rank and/or per bank basis (e.g., by storing variables and/or parameters indicative of such usage in status registers 112 or other suitable medium). As memory is allocated and/or de-allocated, memory controller 108 may update variables and/or parameters stored in status registers 112 indicative of the usage of the various banks 110. For example, memory controller 108 may be configured to track a bank-in-use status of each bank 110. Such bank-in-use information may be stored in status registers 112 or another suitable medium. As the bank-in-use status is updated as banks 110 are allocated and de-allocated, memory controller 108 may also alter contents of a mode register (e.g., mode register MR2, as described above with respect to Example Embodiment 1) to indicate usage of banks 110 in according with the existing JEDEC Specification. Accordingly, during self-refresh, only a portion of the memory banks 110, as indicated by the PASR field, may be refreshed, which may reduce power consumption associated with refresh as compared to traditional approaches.

Figure 4A:
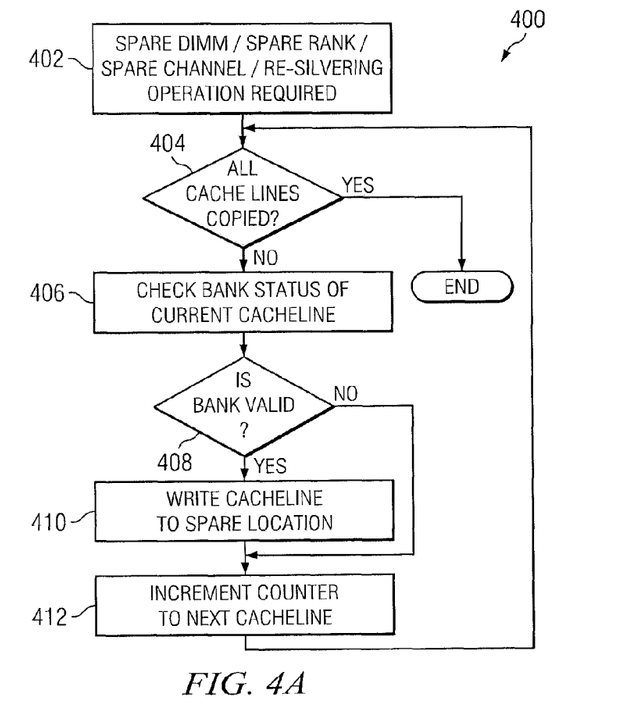
FIGS. 4A and 4B illustrate a flow chart of example methods for executing reliability, availability, and serviceability (RAS) features in a memory module, in accordance with certain embodiments of the present disclosure.
Figure 4B:
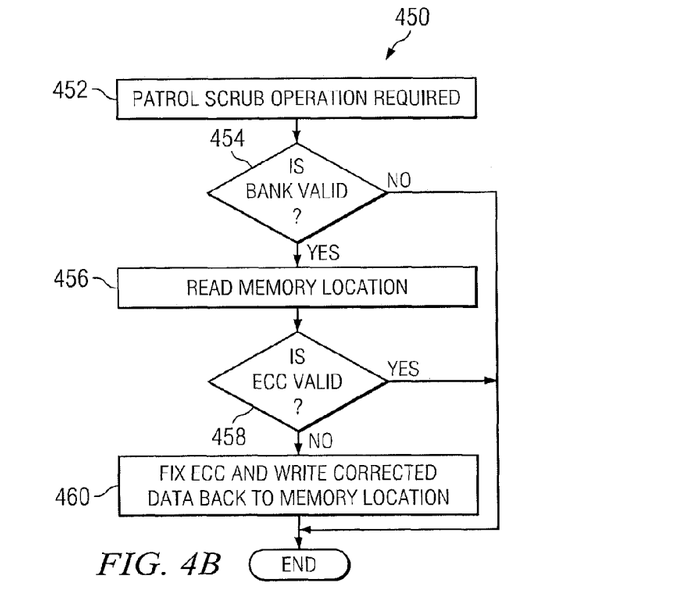

In Example Embodiment 2, RAS features of memory controller 108 (e.g., patrol scrubbing, sparing, mirroring, etc.) may be enabled, and memory controller 110 may check the bank-in-use status of each bank 110 before performing such RAS operation, such as depicted in FIGS. 4A and 4B below.

FIG. 4A illustrates a flow chart of an example method 400 for executing certain reliability, availability, and serviceability (RAS) features in a memory module 116, in accordance with certain embodiments of the present disclosure. According to one embodiment, method 400 may begin at step 402. As noted above, teachings of the present disclosure may be implemented in a variety of configurations of information handling system 102. As such, the initialization point for method 400 and the order of the steps 402-412 comprising method 400 may depend on the implementation chosen.

At step 402, a spare DIMM, spare rank, spare channel, or re-silvering operation may be required by memory controller 108. At step 404, processor 103, memory controller 108, and/or another component of information handling system 102 may determine if all memory cache lines responsive to the required RAS operation have been copied. If it is determined that all memory cache lines responsive to the required RAS operation have been copied, method 400 may end. Otherwise, method 400 may proceed to step 406.

At step 406, in response to a determination that not all memory cache lines responsive to the required RAS operation have been copied, processor 103, memory controller 108, and/or another component of information handling system may determine the bank status of the current cacheline. The bank status may include whether or not the current cacheline is associated with a bank 110 that is presently valid (e.g., presently allocated or active). At step 408, if it is determined that the bank 110 associated with the cacheline is valid, method 400 may proceed to step 410. Otherwise, method 400 may proceed to step 412.

At step 410, in response to a determination that a the bank 110 associated with the current cacheline is valid, the cacheline may be written to the spare location.

At step 412, a counter may be incremented to indicate that the next cacheline should next be processed in accordance with the steps above. After completion of step 412, method 400 may proceed again to step 404.

Although FIG. 4A discloses a particular number of steps to be taken with respect to method 400, method 400 may be executed with greater or lesser steps than those depicted in FIG. 4A. In addition, although FIG. 4A discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

FIG. 4B illustrates a flow chart of an example method 450 for executing a patrol scrub in a memory module 116, in accordance with certain embodiments of the present disclosure. According to one embodiment, method 450 may begin at step 452. As noted above, teachings of the present disclosure may be implemented in a variety of configurations of information handling system 102. As such, the initialization point for method 450 and the order of the steps 452-460 comprising method 450 may depend on the implementation chosen.

At step 452, a patrol scrub operation may be required by memory controller 108. At step 454, processor 103, memory controller 108, and/or another component of information handling system may determine whether the bank 110 associated with the patrol scrub operation is presently valid (e.g., presently allocated or active). If it is determined that the bank 110 is valid, method 450 may proceed to step 456. Otherwise, method 450 may end.

At step 456, processor 103, memory controller 108, and/or another component of information handling system may read the memory location associated with the patrol scrub operation. At step 458, processor 103, memory controller 108, and/or another component of information handling system may determine whether or not an error correction code (ECC) associated with the memory location is valid. If it is determined that the ECC is not valid, method 450 may proceed to step 460. Otherwise, method 450 may end.

At step 460, in response to a determination that the ECC is not valid, the ECC may be fixed and corrected data may be written back to the memory location.

Although FIG. 4B discloses a particular number of steps to be taken with respect to method 450, method 450 may be executed with greater or lesser steps than those depicted in FIG. 4B. In addition, although FIG. 4B discloses a certain order of steps to be taken with respect to method 450, the steps comprising method 450 may be completed in any suitable order.

Method 450 may be implemented using information handling system 102 or any other system operable to implement method 450. In certain embodiments, method 450 may be implemented partially or fully in software and/or firmware embodied in computer-readable media.

Example Embodiment 3

Example Embodiment 3 may be similar to Example Embodiment 2, except that Example Embodiment 3 defines an enhancement to a command present in traditional approaches. For example, the REFRESH command protocol of the JEDEC Specification may be enhanced to enable partial memory refresh.

Figure 5A:
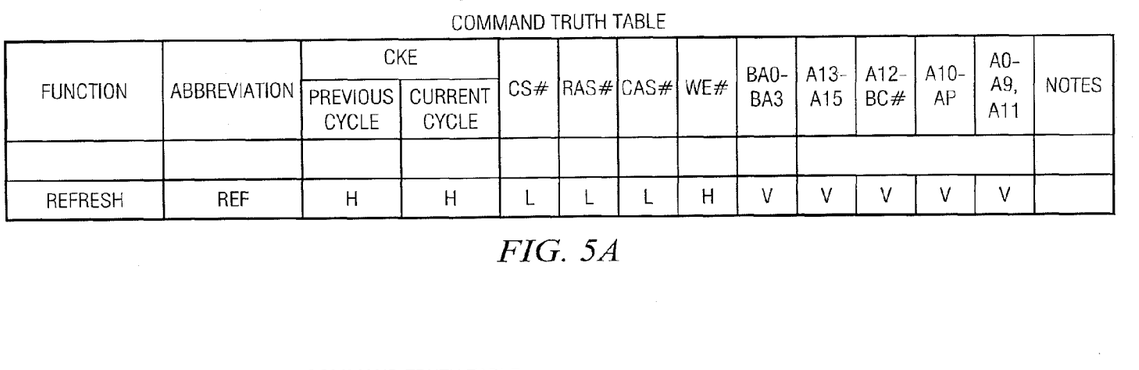
FIG. 5A illustrates a command format for a refresh command according to the JEDEC Specification, in accordance with certain embodiments of the present disclosure.
Figure 5B:
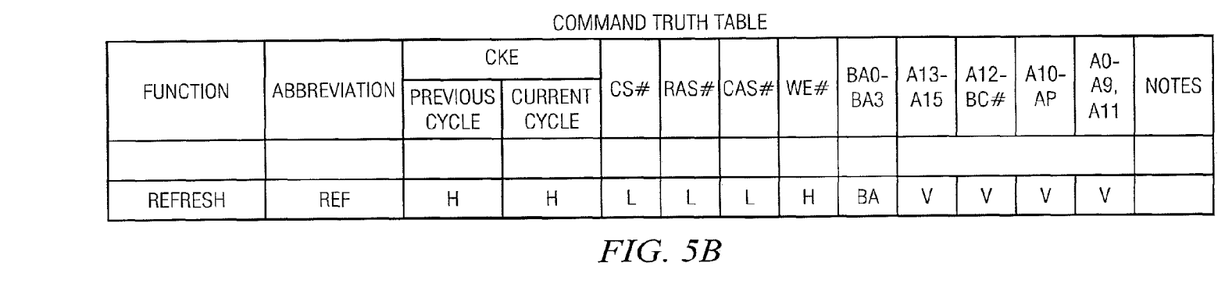
FIG. 5B illustrates a command format for a modified refresh command, in accordance with certain embodiments of the present disclosure.
Figure 6:
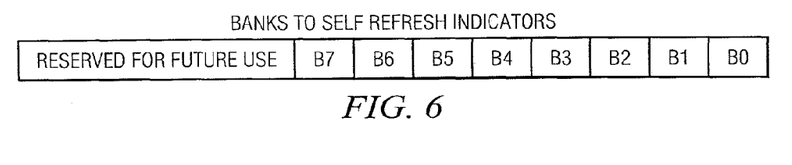
FIG. 6 illustrates various fields associated with a mode register for use with a partial memory refresh command, in accordance with certain embodiments of the present disclosure.

FIG. 5A illustrates a command format for a REFRESH command according to the JEDEC Specification. In accordance with the JEDEC Specification, a REFRESH command, known as a "direct" refresh, may cause refresh to occur in a bank 110 of a memory module 116 determined by the memory module 116. Notably, the BA3:0 field is not presently used by the REFRESH command. However, this field of the traditional REFRESH command may be used to indicate a specific bank to be refreshed pursuant to a direct refresh command. For example, as shown in FIG. 5B, in an eight-bank memory, the JEDEC standard REFRESH command may be modified such that field BA2:0 may be used to indicate the bank to be refreshed. Accordingly, Example Embodiment 3 adds partial memory direct refresh to the partial self-refresh functionality described in Example Embodiments 1 and 2.

Example Embodiment 4

Example Embodiment 4 may be similar to Example Embodiment 3, except that Example Embodiment 4 defines a new data register. For example, Example Embodiment 4 may define a new JEDEC mode register, as shown in FIG. 4. The new mode register may include a bit for each bank 110. Accordingly, this new register allows for arbitrary enabling and disabling for each bank 110, as compared to the more rigid groupings supported by the standard PASR field of mode register MR2, as described above. Thus, during self-refresh, a portion of the memory banks 110, as indicated by the new mode register, may be refreshed, which may reduce power consumption associated with refresh as compared to traditional approaches.

Although the present disclosure has been described in detail, it should be understood that various changes, substitutions, and alterations can be made hereto without departing from the spirit and the scope of the disclosure as defined by the appended claims. As a specific example, although the embodiments above describe enabling refresh on a per bank basis for the purposes of simplicity and exposition, any appropriate level of granularity, whether a larger or smaller granularity than a bank, may be used.

What is claimed is:

1. A method for reducing power consumption in memory, comprising:
    tracking, by an operating system executing on a processor, one or more logical units of a memory system that are in use;
    setting, by the operating system, a Partial Array Self Refresh field of a mode register, wherein the field indicates a portion of the logical units of the memory system that are in use, wherein each logical unit of the memory system is a bank of the memory system;
    analyzing the field of the mode register to determine if a particular logical unit is in use;
    refreshing a particular logical unit, to the exclusion of other logical units, in response to a determination that the particular logical unit is in use; and
    executing a reliability, availability, and serviceability operation on the particular logical unit in response to a determination that the variable indicated the particular logical unit is in use, wherein the reliability, availability, and serviceability operation includes a patrol scrubbing, sparing, mirroring, or re-silvering operation.

2. A method according to claim 1, further comprising disabling, by the operating system, logical unit-level interleaving.

3. A method according to claim 1, further comprising disabling, by the operating system, reliability, availability, and serviceability features of a memory controller configured to control the one or more logical units.

4. A method according to claim 1, wherein refreshing includes refreshing one or more of the one or more logical units in response to a REFRESH command, wherein the REFRESH command includes a field indicating a particular logical unit to be refreshed.

5. A method according to claim 1, wherein refreshing includes refreshing one or more of the one or more logical units in response to a REFRESH command, wherein the mode register includes field indicating a particular logical unit to be refreshed.

6. An information handling system, comprising:
    a processor;
    a memory system communicatively coupled to the processor and having one or more logical units;
    a computer-readable medium communicatively coupled to the processor and having stored thereon one or more executable instructions, the one or more executable instructions configured to, when executed by the processor:
    track one or more logical units of a memory system that are in use;
    set a Partial Array Self Refresh field of a mode register, wherein the field indicates a portion of the logical units of the memory system that are in use, wherein each logical unit of the memory system is a bank of the memory system;
    analyze the field of the mode register to determine if a particular logical unit is in use;
    refresh a particular logical unit, to the exclusion of other logical units, in response to a determination that the particular logical unit is in use; and
    execute a reliability, availability, and serviceability operation on the particular logical unit in response to a determination that the variable indicated the particular logical unit is in use, wherein the reliability, availability, and serviceability operation includes a patrol scrubbing, sparing, mirroring, or re-silvering operation.

7. An information handling system according to claim 6, the one or more executable instructions further configured to, when executed by the processor, disable logical unit-level interleaving.

8. An information handling system according to claim 6, the one or more executable instructions further configured to, when executed by the processor, disable reliability, availability, and serviceability features of a memory controller configured to control the one or more logical units.

9. An information handling system according to claim 6, wherein refreshing includes refreshing one or more of the one or more logical units in response to a REFRESH command, wherein the REFRESH command includes a field indicating a particular logical unit to be refreshed.

10. An information handling system according to claim 6, wherein refreshing includes refreshing one or more of the one or more logical units in response to a REFRESH command, wherein the mode register includes a field indicating a particular logical unit to be refreshed.

11. A method for reducing power consumption in memory, comprising:

setting, by an operating system executing on a processor, a Partial Array Self Refresh field of a mode register, wherein the field indicates a portion of the logical units of the memory system that are in use, wherein each logical unit of the memory system is a bank of the memory system;

analyzing the field of the mode register indicating a portion of the one or more logical units of the memory system that are in use to determine if a particular logical unit is in use;

issuing a command, by the operating system, to refresh the particular logical unit of a memory to the exclusion of other logical units of the memory, in response to a determination that the particular logical unit is in use;

executing a reliability, availability, and serviceability operation on the particular logical unit in response to a determination that the particular logical unit is in use, wherein the reliability, availability, and serviceability operation includes a patrol scrubbing, sparing, mirroring, or re-silvering operation.

12. A method according to claim 11, wherein the command is a command substantially similar to a REFRESH command in accordance with the Joint Electron Device Engineering Council (JEDEC) Standard for memory devices, the command including a field indicating the logical unit to be refreshed.

13. A method according to claim 12, wherein the field indicating that the logical unit is to be refreshed is a bank address (BA) field of a REFRESH command of the JEDEC Standard.

* * * * *